O. C. SAMPHERE.
DENTAL MANDREL.
APPLICATION FILED NOV. 22, 1913.
1,106,894.
Patented Aug. 11, 1914.
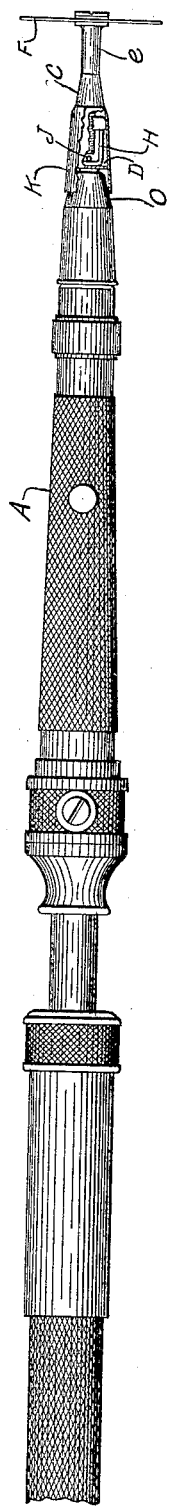
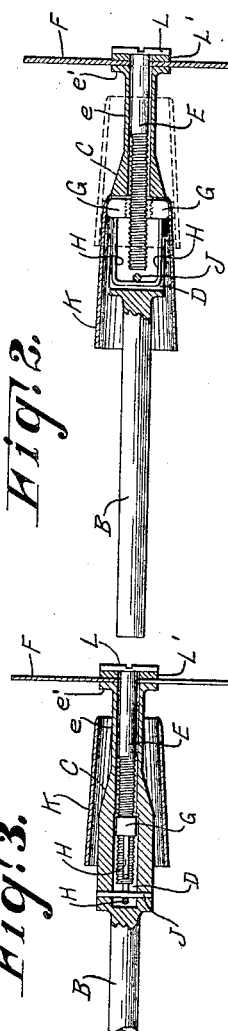
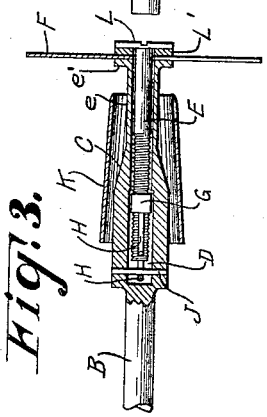
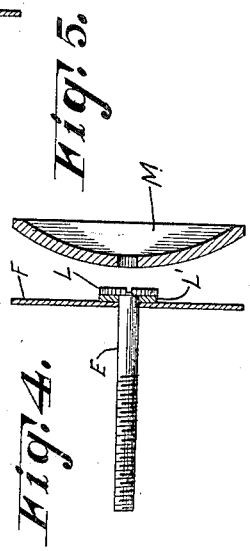
Witnesses
Inventor
Orin C Samphere
By Erwin + Wheelen
Attorneys

UNITED STATES PATENT OFFICE.

ORIN C. SAMPHERE, OF MILWAUKEE, WISCONSIN.

DENTAL MANDREL.

1,106,894.  Specification of Letters Patent.  Patented Aug. 11, 1914.

Application filed November 22, 1913. Serial No. 802,447.

*To all whom it may concern:*

Be it known that I, ORIN C. SAMPHERE, a citizen of the United States, residing at the city of Milwaukee, county of Milwaukee, and State of Wisconsin, have invented new and useful Improvements in Dental Mandrels, of which the following is a specification.

My invention relates to improvements in dental mandrels.

The object of my invention is to provide a form of mandrel in connection with which a series of operating tools may be interchangeably used and in which each of such tools may be quickly removed and replaced by another and the replaced tool securely held by the mandrel while in use.

In the drawings—Figure 1 is a view of a dental mandrel embodying my invention, partially broken away to show the gripping tongs and threaded tool shank. Fig. 2 is a detail sectional view, on an enlarged scale, of the gripping jaws or chuck and the tool, its shank and the sliding locking sleeve. Fig. 3 is a similar view, taken at right angles to the view shown in Fig. 2, showing the locking sleeve in releasing position. Fig. 4 is a detail view of a tool and its shank as it appears when detached, the tool being shown in section. Fig. 5 is a sectional view of a modified form of tool adapted to be substituted for the one shown in Fig. 3.

Like parts are identified by the same reference characters throughout the several views.

The body A of the mandrel may be of any ordinary construction. The tool driving stem or shaft B, however, is provided near its upper end with a head C, having a slot D therein and also having a tubular aperture to receive the shank E of the tool. The head C is provided with a neck $e$, through which the shank E passes and at the outer end of the neck a circular flange $e'$ is provided against which the tool F may be clamped.

The inner end of the shank E is screw threaded, and a pair of clutch dogs G are provided with segmental threads on their inner faces adapted to engage the threads of the shank E. These clutch dogs are supported by arms H, both of said arms being preferably formed of a continuous piece of metal which is looped across the base of the slot D underneath the cross pin J. The arms H are resilient and tend to hold the clutch dogs G out of engagement with the threaded shank E. They may be pressed into such engagement, however, by a sleeve K, which may be adjusted longitudinally to bear upon the projecting outer portions of the dogs and force them inwardly. The outer end of the shank E is provided with a head L and a suitable washer L', preferably non-metallic.

When the dogs are in engagement with the threads of the shank E, a rotation of the stem or shaft B may be transmitted to the shank E and the tool. But if the tool and shank E be held against rotation, then the rotation of the stem B and head C in one direction will cause the shank E to screw feed inwardly until the tool is securely clamped against the flange $e'$, whereupon it will no longer be possible to hold the tool against rotation, if stem B and head C continue to rotate in that direction. If the direction of rotation is reversed and the tool and shank E held, shank E will unscrew and the tool will become loose, but the tool will ordinarily be driven (rotated) in the direction which tends to clamp it to the flange $e'$.

By moving sleeve K to the releasing position shown in Fig. 3, shank E will be released, for the arms H will then retract the dogs G. The tool and shank E may then be freely withdrawn. When withdrawn, the tool F (which may be assumed to consist of a sand paper disk), may be slipped from the shank, and a grinding wheel M similar to that shown in Fig. 5 or any other suitable form of tool, may be substituted. The arms H, being engaged underneath the cross pin J, are in loose connection with the head C and this allows the pressure of the dogs to equalize. I prefer, however, to depend upon the resilience of the arms to retract the dogs G from clutching position, since the retracting movement is thus made positive and automatic. The sleeve K may, if desired, be made long enough to cover the joint between the projecting head C and the tapered extremity O of the body A, thus tending to exclude saliva from this joint when the tool is in operation in the mouth of a patient. The neck $e$ enables me to locate the adjustable sleeve and the clutch dogs at a sufficient distance from the tool to facilitate manipulation of the sleeve.

I claim—

1. A dental mandrel including a driving shaft provided with a head, a pair of clutch dogs adjustably connected with the head and having their inner faces threaded, a tool engaging shank fitted to the head and provided with a screw thread adapted to be engaged by the threaded portions of said clutch dogs, and a clutch setting sleeve slidably mounted upon said head and adapted in one position to hold the dogs in screw connection with said shank.

2. A dental mandrel including a driving shaft provided with a head and a neck portion having a tool receiving extremity, a pair of clutch dogs adjustably connected with the head and having their inner faces threaded, a tool clamping shank extending through said neck portion into the head and threaded for engagement by the threaded portions of said clutch dogs, and a clutch setting sleeve slidably mounted upon said head, said tool clamping shank being headed and adapted to pass through an apertured tool to engage the same between its head and said extremity of the neck portion.

3. A dental mandrel, comprising the combination of a relatively stationary body, a driving shaft extending therethrough and provided with a slotted head, said head having a longitudinal shank receiving aperture, a screw threaded tool holding shank adapted to enter the aperture in said head, a set of clutch dogs resiliently mounted in the head slot and having their inner faces threaded to engage the threaded shank, the mountings of said clutch dogs being adapted to automatically retract them from shank engagement, and a sleeve mounted to slide upon the head and adapted to bear upon the clutch dogs and press them inwardly when the sleeve is in one position of adjustment, whereby said dogs are brought into engagement with the threaded tool holding shank.

In testimony whereof I affix my signature in the presence of two witnesses.

ORIN C. SAMPHERE.

Witnesses:
JAS. B. ERWIN,
IRMA D. BREMER.

---

Copies of this patent may be obtained for five cents each, by addressing the "Commissioner of Patents, Washington, D. C."